United States Patent Office 3,598,864
Patented Aug. 10, 1971

3,598,864
BISPHENOL POLY(ESTER-AMIDES)
John R. Caldwell and Winston J. Jackson, Jr., Kingsport, Tenn., assignors to Eastman Kodak Company, Rochester, N.Y.
No Drawing. Filed Aug. 20, 1969, Ser. No. 851,727
Int. Cl. C08g 20/30
U.S. Cl. 260—476Z                                6 Claims

ABSTRACT OF THE DISCLOSURE

Poly(ester-amide) copolymers derived from bisphenols, aromatic dicarboxylic acids and aromatic amino acids have been found to exhibit improved solvent resistance, stress cracking resistance and also increased stiffness, tensile strength, hardness and heat distortion temperature.

---

This invention relates to preparation of new poly-(ester-amide) copolymers. More particularly, the invention concerns the manufacture of linear, high molecular weight, poly(ester-amide) copolymers derived from bisphenols, aromatic dicarboxylic acids and aromatic amino acids.

Polyesters derived from aromatic and aliphatic dihydric alcohols and dicarboxylic acids are known. Certain of these polyesters, e.g., the polyesters derived from dihydric phenols such as hydroquinone and aromatic dicarboxylic acids, the polyesters derived from cyclohexanedimethanol and aromatic dicarboxylic acids, and the polyesters of aliphatic glycols such as ethylene glycol and aromatic dicarboxylic acids, all exhibit high resistance to volatile solvents, particularly chlorinated aliphatic hydrocarbons such as chloroform. Other polyesters such as those derived from bisphenols and aromatic dicarboxylic acids are quite susceptible to these solvents and consequently cannot be used in various applications requiring solvent resistance. For instance, films of these polymers cannot be used as the dielectric in power capacitors which must be filled with chlorinated aromatic hydrocarbons (non-flammable impregnants which suppress corona) because these chlorinated compounds are solvents for the film. The polymers cannot be used as coatings for wire which may contact many aromatic compounds. Fibers of the polymers cannot be dry cleaned with the usual chlorinated hydrocarbon cleaning agents which swell the fibers.

Accordingly, it is an object of this invention to provide modified polyesters of bisphenol and aromatic dicarboxylic acids of increased solvent resistance.

Another object of the invention is to provide polymeric shaped objects with improved resistance to stress cracking in the presence of organic liquids.

Yet, a further object of the invention is to provide polymeric shaped objects with improved resistance to stress cracking in the presence of organic liquids.

Yet, a further object of the invention is to provide polymeric shaped objects of modified bisphenol polyesters which, in addition to being highly resistant to volatile solvents, exhibit increased heat distortion temperature, stiffness, tensile strength and hardness.

The objects of the invention are accomplished by preparing poly(ester-amides) composed of recurring units having the structure:

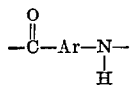

wherein Ar is aryl and recurring units having the structure:

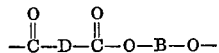

wherein

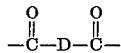

is the residue of an aromatic dicarboxylic acid and —O—B—O— is the residue of a bisphenol, said poly-(ester-amide) having an inherent viscosity of at least about 0.4. Whenever the term "inherent viscosity" (I.V.) is used in this application, it will be understood to refer to viscosity determinations made at 25° C. using 0.23 gram of polymer per 100 ml. of a solvent composed of 60% phenol and 40% tetrachloroethane.

The poly(ester-amides) of the invention are the reaction products of (A) at least one aromatic dicarboxylic acid, (B) at least one bisphenol and (C) an aromatic mono-amino-monocarboxylic acid, the relative proportions of (A), (B) and (C) being such that constituent (A) and constituent (B) are present in substantially equimolar amounts and (C) is from 5 to 50 mole percent, preferably 20 to 50 mole percent of (A) and (B). It should be understood that suitable derivatives of the reactants be employed to effect reaction of the components. For example, bisphenols and aromatic amino groups are difficult to react with free carboxylic acid groups. It is advisable, therefore, to employ the acid halide derivative of the dicarboxylic acid or to acylate the amino group of the aromatic amino carboxylic acid and the hydroxyl groups of the bisphenol. Preferably, the poly(ester-amides) of the invention are prepared from acyl derivatives of aromatic amino carboxylic acids, diacylated bisphenols and aromatic dicarboxylic acids.

The acylated aromatic amino acids of the invention give the following recurring polyamide units:

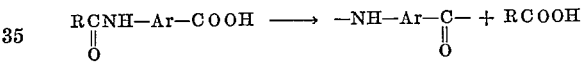

wherein R is hydrogen or an alkyl group containing 1 to 8 carbon atoms and Ar is aryl. Methyl is preferred for R (acetamido derivatives). Amide linkages are also formed by reaction of the acylated aromatic amino acid with the aromatic dicarboxylic acid:

wherein D is the divalent hydrocarbon nucleus of the aromatic dicarboxylic acid.

Acylation of the amino group of the aromatic amino carboxylic acid may be accomplished by treating the amino acid with an anhydride or acid chloride as described in the literature. The carboxyl group in the amino acids is attached to the aromatic ring. If the carboxyl group and amino group are present on the same aromatic ring, they should preferably be in meta- or para-positions with respect to each other, as the ortho-amino acids tend to be less stable. The aromatic nucleus may be derived from benzene or a condensed polycyclic aromatic system such as naphthalene, phenanthrene, etc. The aromatic ring may contain substituents such as lower alkyl, phenyl and halogen. A particularly useful class of aromatic amino acids has the general structure:

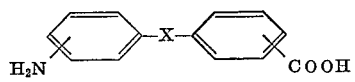

wherein X is an alkylene, cycloalkylene or an alkylene oxy group, preferably of 1 to 10 carbon atoms.

Suitable aromatic amino acids are represented by the following: m- and p-aminobenzoic acid, 3-amino-4-methylbenzoic acid, 3-amino-5-chlorobenzoic acid, 4'-amino-3-carboxydiphenyl ether, 4'-amino-4-carboxydiphenyl and 4'-carboxy-4-aminodiphenylmethane. Aromatic amino acids that contain the naphthalene nucleus are represented by 1-carboxy-3-amino-naphthalene, 2-carboxy-6-amino-naphthalene, and 2-carboxy-7-amino-naphthalene.

Bisphenols which can be advantageously used in preparing the poly(ester-amide) copolymers include those illustrated by the general formula:

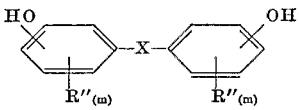

wherein R″ is hydrogen, chlorine, bromine, nitro, alkyl or alkoxy; X is oxygen, substituted- or non-substituted-alkyl or cycloalkyl, alkaryl, sulfur or sulfur-containing radicals such as sulfonyl, or radicals having the formula:

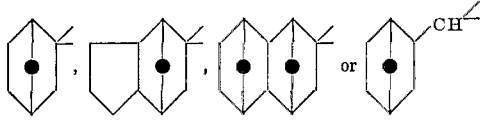

and $m$ is 1, 2, 3 or 4.

Illustrative of suitable bisphenols are 4,4′-isopropylidenediphenol (Bisphenol A),
4,4′-cyclohexylidenediphenol,
4,4′-(2-norbornylidene)diphenol,
4,4′-(2-norbornylidene)di-o-cresol,
4,4′-(2-norbornylidene)bis[2,6-dichlorophenol],
4,4′-(hexahyro-4,7-methanoindan-5-ylidene)diphenol,
4,4′-(hexahydro-4,7-methanoindan-5-ylidene)di-o-cresol,
4,4′-(hexahydro-4,7-methanoindan-5-ylidene)bis[2,6-dichlorophenyl],
4,4′-(decahydro-1,4:5,8-dimethanonaphth-2-ylidene)diphenol,
4,4′-(2-norbornylmethylene)diphenol,
4,4′-(2-norbornylmethylene)bis[2,6-dichlorophenol],
4,4′-(3-methyl-2-norbornylmethylene)diphenol,
4,4′-sulfonyldiphenol,
4,4′-thiodiphenol,
2,4′-dihydroxydiphenylmethane,
4,4′-(decahydro-1,4:5,8-dimethanonaphth-2-ylidene)-di-o-cresol,
bis-(4-hydroxyphenyl)-methane,
bis-(4-hydroxy-5-nitrophenyl)-methane,
bis-(4-hydroxy-2,6-dimethyl-3-methoxyphenyl)-methane,
1,1-bis-(4-phenyl)ethane,
1,1-bis-(2,5-dimethyl-4-hydroxy-2-chlorophenyl)ethane,
1,1-bis-(2,5-dimethyl-4-hydroxyphenyl)ethane,
1,3-bis-(3-methyl-4-hydroxphenyl)propane,
2,2-bis-(3-phenyl-4-hydroxyphenyl)propane,
2,2-bis-(3-isopropyl-4-hydroxyphenyl)propane,
2,2-bis-(4-hydroxyphenyl)pentane,
3,3-bis-(4-hydroxyphenyl)pentane,
2,2-bis(4-hydroxyphenyl)heptane,
bis-(4-hydroxyphenyl)phenyl methane,
bis(4-hydroxyphenyl)cyclohexyl methane,
1,2-bis-(4-hydroxyphenyl)-1,2-bis-(phenyl)ethane,
2,2-bis-(4-hydroxyphenyl)1,3-bis-(phenyl) propane,
2,2-bis(4-hydroxyphenyl)-1-phenyl propane and the like disclosed in U.S. Pats. Nos. 3,030,335 and 3,317,466.

Diacylated bisphenols may be prepared by heating the bisphenol and acid anhydride, such as acetic anhydride, as described in U.S. Pat. No. 2,595,343, or it may be prepared by treating the bisphenol dissolved in a tertiary amine with an acid chloride. Other preparative methods are described in the literature. Reaction of the diacylated bisphenol and dicarboxylic acid gives the following polyester units:

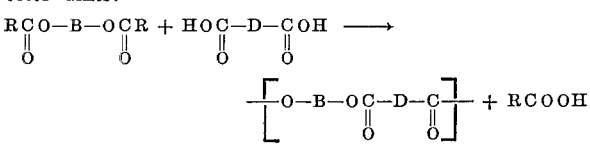

wherein R, B and D are previously defined.

In general, all of the aromatic dicarboxylic acids disclosed in the polyamide art can be used, providing they contain at least three carbon atoms between the carboxyl groups in the aromatic acids. Typical aromatic acids are represented by isophthalic, 4-methylisophthalic, 5-tert-butylisophthalic, terephthalic, 2-methylterephthalic, the isomeric naphthalenedicarboxylic acids, etc. The carboxyl groups may be on different aromatic nuclei that are joined by a direct bond or by a divalent radical such as:

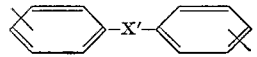

wherein X′ is a direct bond, —CH$_2$—, —(CH$_2$)$_2$—, —CH(CH$_3$)—, —CH(C$_2$H$_5$)—, —C(CH$_3$)$_2$—, —O—, —O—CH$_2$—, —O—(CH$_2$)$_2$—O—, —O—(CH$_2$)$_4$—O—, —S—, and —SO$_2$—.

Reaction or condensation of the acylated bisphenol, aromatic dicarboxylic acid and acyl amino aromatic acid components of the copolymer of the present invention may be effected by merely heating the components at an elevated temperature such as about 150° to 350° C. A catalyst is not required for the reaction, but the polymerization can be facilitated by adding a catalytic amount of a suitable catalyst such as magnesium powder. An inert atmosphere should be employed for the reaction and agitation is preferably employed in order to facilitate the removal of the monocarboxylic acid product from the viscous melt. Reduced pressure is advantageously used, particularly in the latter stages of the reaction.

The poly(ester-amide) copolymers of the invention may be extruded into films or fiber or injection-molded to give various shaped objects with improved solvent resistance, stress cracking resistance and increased stiffness, tensile strength, hardness and heat distortion temperature. If desired, additives conventionally added to the polymers such as various pigments, dyes, reinforcing agents, stabilizers, antioxidants, plasticizers, etc., may be incorporated in the poly(ester-amides).

The following examples are included to further illustrate the present invention.

EXAMPLE I

In a 100 ml. flask are placed 8.05 g. (0.045 mole) of p-acetamidobenzoic acid, 9.13 g. (0.055 mole) of isophthalic acid, 17.16 g. (0.055 mole) of bisphenol A diacetate, and 0.0005 g. of magnesium powder. To remove all traces of air, the flask is three times evacuated and purged with nitrogen. The pressure is then reduced to 100 mm. and the mixture is stirred while being heated in a metal bath which is increased in temperature from 150° C. to 250° C. during about 30 minutes. After another 90 minutes, the acetic acid has stopped distilling out; the temperature is then increased to 295° C. for 30 minutes. After the mixture is stirred about 10 minutes at 340° C., the pressure is reduced to 0.5 mm. and stirring continued for 30 minutes longer. The flask is then removed from the bath and allowed to cool. The polymer has an inherent viscosity of 0.62, melts above 300° C., and is insoluble in boiling 1,1,2,2-tetrachloroethane. The homopolyester, bisphenol A polyisophthalate, is soluble in tetrachloroethane. Compared to this polyester molded bars of the poly(ester-amide) have improved resistance to stress cracking when immersed at 3% strain in ethanol and in heptane.

The bars also have the following properties: flexural modulus 4.1×10$^5$ p.s.i., tensile strength 13,200 p.s.i., elongation 20%, Rockwell hardness L116, and heat distortion temperature (264 p.s.i. load) 230° C. Injection-molded bars of the unmodified polyester (I.V. 0.70) have lower stiffness, tensile strength, hardness and heat distortion temperature: flexural modulus 2.9×10⁵ p.s.i., tensile strength 10,600 p.s.i., elongation 80%, Rockwell hardness L107, and heat distortion temperature 179° C.

EXAMPLE II

When 0.050 mole of 6 - acetamido-2-naphthalenecarboxylic acid is used as the acylamino acid in Example I and 2,6-naphthalenedicarboxylic acid replaces isophthalic acid, a poly(ester-amide), is obtained which melts above 300° C., has an inherent viscosity of 0.57, and has improved resistance to stress cracking in ethanol and heptane.

EXAMPLE III

A poly(ester-amide) is prepared from 0.12 mole of m-acetamidobenzoic acid, 0.090 mole of terephthalic acid, 0.090 mole of isophthalic acid and 0.18 mole of bisphenol A diacetate by the procedure of Example I. The poly(ester-amide) has an inherent viscosity of 0.64 and a softening point above 300° C. It is insoluble in chloroform and tetrachloroethane. Compared to the polyester containing no amide groups, it shows improved resistance to stress cracking at 3% strain in ethanol and heptane.

Molded bars of this poly(ester-amide) have the following properties: flexural modulus 3.9×10⁵ p.s.i., tensile strength 12,900 p.s.i., elongation 27%, Rockwell hardness L114, and heat distortion temperature (264 p.s.i. load) 226° C. The unmodifield polyester (I.V. 0.64) has the following properties: flexural modulus 3.1×10⁵ p.s.i., tensile strength 10,400 p.s.i., elongation 44%, Rockwell hardness L108, and heat distortion temperature 186° C.

EXAMPLE IV

When Example III is repeated, using 0.020 to 0.18 mole (10 to 50 mole percent) of the following acetamido acids, poly(ester-amides) are obtained with improved resistance to chloroform and improved stress cracking resistance: 3′-acetamido-4-carboxydiphenylmethane, 4′ - acetamido-4-carboxydiphenyl and 1-carboxy-3-acetamidonaphthalene.

Molded bars of the poly(ester-amide) copolymers show increased stiffness, tensile strength, hardness, and heat distortion temperature as compared to the corresponding polyester unmodified with amide groups.

EXAMPLE V

When Example I is repeated, using diacetates of the following bisphenols in the place of bisphenol A diacetate, poly(ester-amides) are obtained which are resistant to chloroform and which show improved stress cracking resistance: 4,4′-isobutylidenediphenol, 4,4′ - cyclohexylidenediphenol and 4,4′-(2-norbornylidene)di(o-cresol).

Molded bars of the poly(ester-amide) copolymers show increased stiffness, tensile strength, hardness and heat distortion temperature, as compared to the corresponding polyester unmodified with amide groups.

The invention has been described in detail with particular reference to preferred embodiments thereof, but it will be understood that variations and modifications can be effected within the spirit and scope of the invention.

It is claimed:

1. A poly(ester-amide) composed of from 5 to 50 mole percent recurring units having the structure:

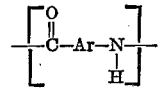

wherein Ar is a divalent aryl radical, and from 95 to 50 mole percent recurring units having the structure:

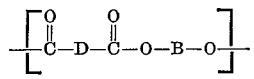

wherein —D— is the divalent radical remaining after removal of the terminal carboxyl groups from an aromatic dicarboxylic acid and —B— is the divalent radical remaining after removal of the terminal hydroxyl groups from a bisphenol, the poly(ester-amide) having an inherent viscosity of at least about 0.4 measured at 25° C. using 0.23 gram of polymer per 100 ml. of a solvent composed of 60% phenol and 40% tetrachloroethane.

2. The poly(ester-amide) of claim 1 wherein the divalent aryl radical has the general structure

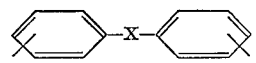

wherein X is an alkylene, cycloalkylene or an alkylene oxy radical containing 1–10 carbon atoms.

3. The poly(ester-amide) of claim 1 wherein the bisphenol has the general structure

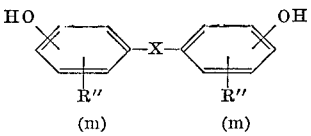

wherein R″ is hydrogen, chlorine, bromine, nitro, alkyl or alkoxy and X is oxygen, alkyl, cycloalkyl, alkaryl, sulfur, sulfonyl, or a radical having the formula:

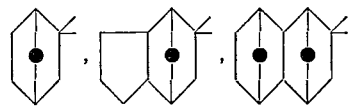

or

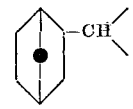

and m is 1, 2, 3 or 4.

4. The poly(ester-amide) of claim 1 wherein —Ar— is para- or meta-phenylene.

5. The poly(ester-amide) of claim 1 wherein —D— is the divalent radical remaining after removal of the terminal carboxyl groups from isophthalic or terephthalic acid.

6. The poly(ester-amide) of claim 1 wherein —B— is

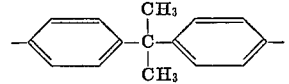

References Cited

UNITED STATES PATENTS

| | | | |
|---|---|---|---|
| 3,272,774 | 9/1966 | Moyer | 260—47 |
| 3,440,218 | 4/1969 | Caldwell | 260—47 |
| 3,313,777 | 4/1967 | Elam et al. | 260—47 |

HAROLD D. ANDERSON, Primary Examiner

L. L. LEE, Assistant Examiner

U.S. Cl. X.R.

260—33.4P, 37N, 49, 78A